United States Patent [19]

Natebusch

[11] 4,048,449
[45] Sept. 13, 1977

[54] METHOD FOR FORMING A CONFERENCE CONNECTION IN A TELECOMMUNICATION SWITCHING SYSTEM

[75] Inventor: Roderich Natebusch, Ottobrunn, Germany

[73] Assignee: Siemens Aktiengesellschaft, Munich, Germany

[21] Appl. No.: 614,695

[22] Filed: Sept. 18, 1975

[30] Foreign Application Priority Data

Sept. 20, 1974 Germany .................... 2445092

[51] Int. Cl.$^2$ .......................................... H04M 3/56
[52] U.S. Cl. .............................................. 179/18 BC
[58] Field of Search ..................... 179/18 BC, 1 CN

[56] References Cited
U.S. PATENT DOCUMENTS

| | | | |
|---|---|---|---|
| 3,551,600 | 12/1970 | Berch | 179/18 BC |
| 3,586,782 | 6/1971 | Thomas | 179/15 AL |
| 3,828,146 | 8/1974 | Lewis | 179/170 NC |
| 3,835,259 | 9/1974 | Medill et al. | 179/18 BC |
| 3,924,082 | 12/1975 | Oliver et al. | 179/18 BC |

Primary Examiner—Thomas W. Brown
Attorney, Agent, or Firm—Schuyler, Birch, Swindler, McKie & Beckett

[57] ABSTRACT

A method is described for connecting at least three subscribers in, e.g., a conference call in time division multiplex (TDM) pulse code modulation (PCM) telecommunication switching systems. In each participating subscriber station a TDM signal having the instantaneous value of the speech signal amplitude is stored for one ring circuit signal period in that subscriber station. The stored TDM signal is subtracted from the TDM signal transferred over the section of the ring circuit connected to the foregoing subscriber station in the TDM time segment assigned to the conference call. Added to the difference signal, so obtained, is a TDM signal displaying the instantaneous value of the speech signal amplitude and, the composite TDM signal obtained in this way is transmitted from the aforementioned subscriber station. The latter subscriber station receives either the difference signal or the composite signal as a TDM signal having the instantaneous values of the speech signals of the conferees.

2 Claims, 1 Drawing Figure

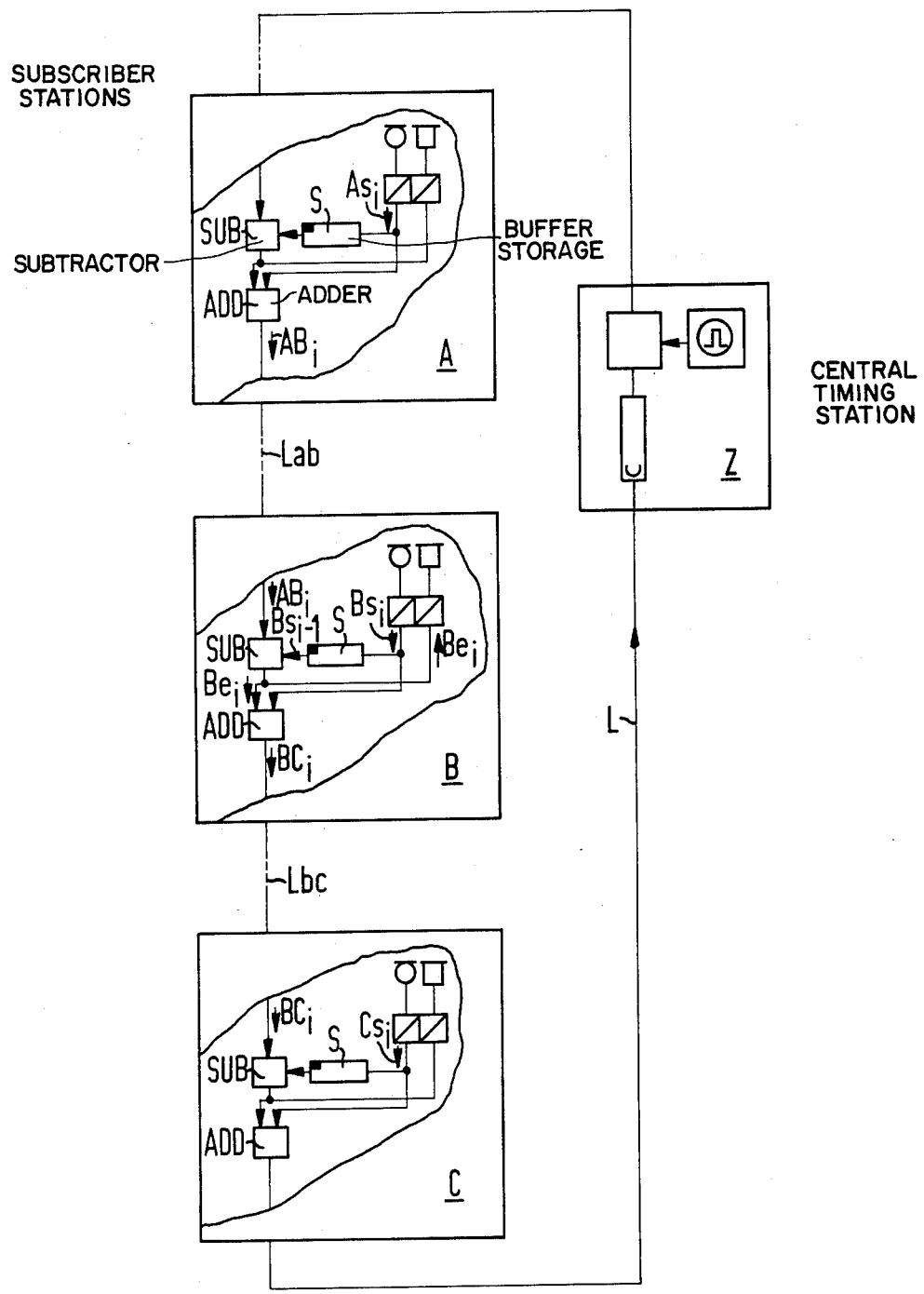

METHOD FOR FORMING A CONFERENCE CONNECTION IN A TELECOMMUNICATION SWITCHING SYSTEM

BACKGROUND OF THE INVENTION

The invention relates to time division multiplex (TDM) telecommunication switching systems. More particularly, it relates to telephone switching systems having pulse code modulation as the signal transmission format and having a directed TDM ring circuit running from subscriber to subscriber.

TDM telephone switching systems of this type are known in the art (cf. U.S. Pat. No. 3,586,782). In such a switching system, connections may be established in such a manner that a plurality of time slots are defined by a central timing station provided in a ring-like circuit. Each subscriber station is synchronized to the frame of the time slots as a result of a synchronizing signal sent by the timing station in a synchronizing time slot. For the call setup the calling subscriber stations uses a time slot identified by the timing station as free and sends in that time slot the signal of the called subscriber station. All subscriber stations monitor all the time slots as to the reception of their signal and, where necessary, are switched to the connection state in the time slot in which they receive (or have received) their signals.

In telecommunication switching systems, more particularly telephone switching systems, there is frequently the demand that, in addition to connections between two subscribers, calls known as conference or cut-in calls also be set up between more than two subscribers. Conference calls can be set up in a simple way in switching systems in which the speech information is transmitted by means of analog signals, such that the subscriber lines of the subscribers are interconnected directly or via buffer storages. This results in the blending of the speech signals of all the conferees (cf. U.S. Pat. Nos. 3,293,369 and 3,319,005).

In switching systems operating according to the pulse code modulation principle, conference calls cannot readily be set up by blending the various speech signals, in view of the generally non-linear modulation characteristic. To conduct conference calls in a PCM telephone switching system, it is known (CCITT documents WP 33/XV No. 6-E of August 1965, page 2, item (3) and SP 33/XV No. 9-E of December 1965, page 10, second paragraph) to convert the PCM signals obtained from the speech signals of the conferees through non-linear coding, that is, in accordance with a non-linear modulation characteristic, to a linear code. Stated another way, these signals are "linearized in digital form", to add in binary notation the "linear" PCM signals and thereafter to reconvert the composite signals obtained to the non-linear code.

A method equivalent to the aforementioned known method is also found in the subject matter of U.S. Pat. No. 3,575,591. It is also known (U.S. Pat. No. 3,575,591) to store the "non-linear" PCM signals temporarily in first registers, convert them to the linear code one after another via a common converter, store the linear PCM signals in second registers, add them thereafter in an accumulator and, finally, convert the composite signals obtained to non-linear PCM signals via the converter. U.S. Pat. No. 3,575,591 further recites the routing to each subscriber in a 3-party conference circuit of only the composite signals obtained by adding the PCM signals of the other two subscribers.

This known conference circuit utilizes a concentrator switching system to which the individual subscriber stations are connected. It is not suited for digital telecommunication systems without an exchange and having a ring circuit running from subscriber station to subscriber station.

It is an object of this invention to provide a method of connecting in a conference call at least 3 subscribers to a TDM telecommunication switching system, more particularly a PCM telephone switching system, having a directed TDM ring-like circuit running from subscriber station to subscriber station.

SUMMARY OF THE INVENTION

In accordance with the invention, the foregoing and other objects are achieved in that in each subscriber station involved in the conference call, the TDM signal displaying the instantaneous value of the speech signal amplitude of that conferee, after non-linear to linear conversion, if needed, is stored in the subscriber station for the duration of one signal cycle, through the TDM ring circuit. The stored TDM signal is subtracted from a TDM signal transferred over a section of the TDM ring-like circuit leading to the subscriber station in the time position assigned to the conference call, and there is added to the differential TDM signal, so obtained, the TDM signal displaying the instantaneous value of the speech signal amplitude, after any non-linear to linear code conversion, which might be needed. The composite TDM signal obtained in this way is retransferred over the section of the TDM ring-like circuit continuing from the subscriber station. Either the composite TDM signal or the differential TDM signal is received by the subscriber station as a TDM signal displaying the instantaneous values of the speech signal amplitudes of the other conferees.

This invention has the advantage that it can set up clearly arranged conference calls (also termed cut-in calls) in a TDM telecommunication system of the type indicated hereinabove without requiring special central switching devices, since the method according to the invention can be performed in the subscriber stations of the TDM telephone system itself.

Another advantage is that the time slot requirements of a conference call are independent of the relevant number of conferees. In a PCM telephone switching system of the type referenced above, only the transfer of a single linear PCM word must be taken into account, which can be placed in two 8-bit time segment of two time slots. As a result, conference calls cause the traffic load of the communication facility to increase only insignificantly. Basically, the number of possible conference calls is unlimited thanks to the method according to the invention.

BRIEF DESCRIPTION OF THE DRAWING

The principles of the invention will be more readily understood by reference to the description of a preferred embodiment given hereinbelow in conjunction with the accompanying single FIGURE drawing, which is a schematic diagram of a TDM telecommunication system constructed to operate according to the invention.

DETAILED DESCRIPTION OF THE DRAWING

The FIGURE is a schematic diagram, on a large scale for better understanding, of a TDM telecommunication switching system having a TDM ring-like circuit L running from subscriber to subscriber, in which are inserted the subscriber stations A, ... B, ... C in a manner in itself known (cf. U.S. Pat. No. 3,586,782). It also shows that the TDM circuit L has a central timing station Z defining a plurality of time slots in which, where appropriate, at the same time the signal recycling time of the TDM ring circuit can be extended to a whole multiple of the time slot period frame period defined by the timing station Z. Such timing stations are likewise old in the art (cf. U.S. Pat. No. 3,586,782), and the one used herein can be constructed accordingly. Basically, in the TDM telecommunication switching system, (time-discontinuous) analog signals or (likewise time-discontinuous) digital signals can be transferred; in particular, in the further description it is assumed that a PCM telephone switching system is involved, over whose TDM ring circuit L PCM words are transferred that are equivalent to TDM signals. Calls between every two subscribers can be set up in the TDM switching system shown in the drawing, in such a manner than each subscriber station A, ..., B ..., C ... is synchronized to the frame of the time slots due to a synchronizing signal sent out in a synchronizing time slot by the timing station Z. In order to establish a connection the calling subscriber station uses a time slot identified as free by the timing station Z and transmits therein the signal of the called subscriber station to the TDM ring circuit. All unused subscriber stations monitor all time slots as to the reception of their signal and, where appropriate, are switched to the connection state in the time slot in which they have received their signal. How this occurs is not detailed in the drawing, since this is not the subject matter of the present invention and also is not necessary for practicing it.

In order to be able to connect more than two parties to one another in a conference call, the subscriber stations in the TDM switching system shown in the drawing each have a digital adder ADD and a digital subtractor SUB, as well as a buffer storage S. The subtractor may be constructed in a manner in itself known (cf. Richards: Arithmetic Operations in Digital Computers, D. van Nostrand Co., Inc., seventh printing, June 1958, pp. 133, 134) primarily with the aid of a digital adder to which, in addition to an intial carry 1, the minuend is fed directly and the subtrahend is routed via a NOT element. The PCM word transferred over the section of the TDM ring circuit L leading to the subscriber station in the time position assigned to the conference call is fed to the minuend input of the subtractor SUB; to the subtrahend input of the subtractor SUB is connected the output of the buffer storage S, which preferably may be formed from a delay-line storage such as basically known, e.g., from FIG. 4 of U.S. Pat. No. 3,271,521 or from FIG. 5 of U.S. Pat. No. 3,296,377, and having a transit time equivalent to the duration of a signal cycle time through the TDM ring circuit L, at the delay line input, there is connected a line carrying the (if necessary, linearized) PCM words displaying the instantaneous values of the speech signal amplitude of the relevant conferee. To this line is also connected one input of the digital adder ADD, to whose other input leads the output of the subtractor SUB. To the output of the subtractor SUB is likewise connected, on the receive side, the subscriber in question. Finally, the output of the digital adder ADD leads to the section of the TDM ring circuit L continuing from the subscriber station.

Alternatively, the subscriber's receiver circuit can be connected to the output of the digital adder so that the subscriber will receive the composite signal and thereby be able to monitor his speech signal as well as those from other subscriber stations.

Assuming that the three subscriber stations A, B, C of a PCM/TDM switching system as shown in the drawing are connected to one another in a conference call, it will be further assumed that in the time position of a time slot frame i assigned to the conference call, a PCM word $AB_i$ is transferred over the section Lab of the TDM ring circuit L leading to the subscriber station B. At the same time, there appears at the output of the buffer storage S of the subscriber station B the PCM word $Bs_{i-1}$ stored therein from the preceding time slot frame i−1, where appropriate, after the non-linear/linear code conversion. The word $Bs_i−1$ corresponds to the previous instantaneous value of the speech signal amplitude of the conferee B. The PCM word $Bs_{i-1}$ is subtracted in the subtractor SUB of the subscriber station B from the PCM word $AB_i$ transferred over the section Lab of the TDM ring circuit L leading to the subscriber station B. A PCM word $Bs_i$ (where necessary linearized) displaying the present instantaneous value of the speech signal amplitude of the conferee B is added in the digital adder AD to the differential PCM word $Be_i$ thus obtained. The summation of the PCM word $BC_i$ thus obtained is transferred over the section Lbc of the TDM ring circuit L continuing from the subscriber station B, so that it travels to the next subscriber station C involved in the conference call, where it is appropriately operated upon. For the summation PCM word $BC_i$ the following relationship applies:

$$BC_i = Bs_i - Bs_{i-1} + AB_i$$
$$= Bs_i - Bs_{i-1} + \Sigma_i As_i - \Sigma_i As_{-i-1} + \Sigma Cs_{i-1} - \Sigma CS_{i-2}$$
$$= Bs_i + As_i + Cs_{i-1},$$

each where As, Bs, Cs each designates the PCM word displaying the instantaneous value of the speech signal amplitude of the relevant conferee A or B or C; AB indicates the PCM word in the time position assigned to the conference call transferred over the section Lab of the TDM ring circuit leading to the subscriber station B; and BC refers to the PCM word in the time position assigned to the conference call retransferred over the section Lbc of the TDM ring circuit L continuing from the subscriber station B. The subscript i or i−1 indicates if the PCM word appearing in a time slot frame is or if the PCM word appearing in the preceding time slot frame i−1 is involved.

The differential PCM word $Be_i$ obtained at the output of the subtractor SUB of the subscriber station B, to which the relationship $Be_i = BC_i - Bs_i = As_i + Cs_{i-1}$ applies, displays the last instantaneous values of the speech signal amplitudes of the other conferees C, A; thus, it is received by the subscriber staion B on the receive side as a PCM word displaying the instantaneous values of the speech signal amplitudes of the other conferees, as shown in the drawing. It should be noted that in contradistinction thereto, as indicated hereinabove, the summation PCM word $BC_i$ can also be received on the receive side by the subscriber station B, if the subscriber must also monitor his own speech signal at the same time.

The other subscriber stations involved in the conference call operate in the same fashion, so that each conferee receives as an aural signal precisely the last speech signals of the other conferees.

The principles of the inventive method are described hereinabove by describing the construction and operation of preferred apparatus for carrying out the method. It is contemplated that this apparatus or its operating parameters can be modified or changed while remaining within the scope of the invention as defined by the appended claims.

I claim:

1. A method for connecting at least three subscribers participating in a conference call in a pulse code modulation (PCM), time division mulitplex(TDM) telecommunication system having subscriber stations connected in a ring-like TDM circuit, comprising the steps of:

generating in each said participating subscriber station a first TDM signal corresponding to the instantaneous value of a speech signal issuing from that subscriber station, storing said first TDM signal in the subscriber station where it is generated for a period of a signal cycle through said ring-like circuit, subtracting a second signal from an incoming signal from other subscriber stations in the time position assigned to the conference call to produce a difference signal, said second signal being a previously stored first signal, adding said first signal and said difference signal to produce a composite signal, and transmitting said composite signal over said ring-like circuit from the subscriber station where it was produced, whereby at least said difference signal is received by a said participating subscriber station as a TDM signal corresponding to instantaneous speech values in others of said participating subscriber stations.

2. The method defined in claim 1 wherein said generating step includes non-linear to linear code conversion.

* * * * *